United States Patent Office 3,459,834
Patented Aug. 5, 1969

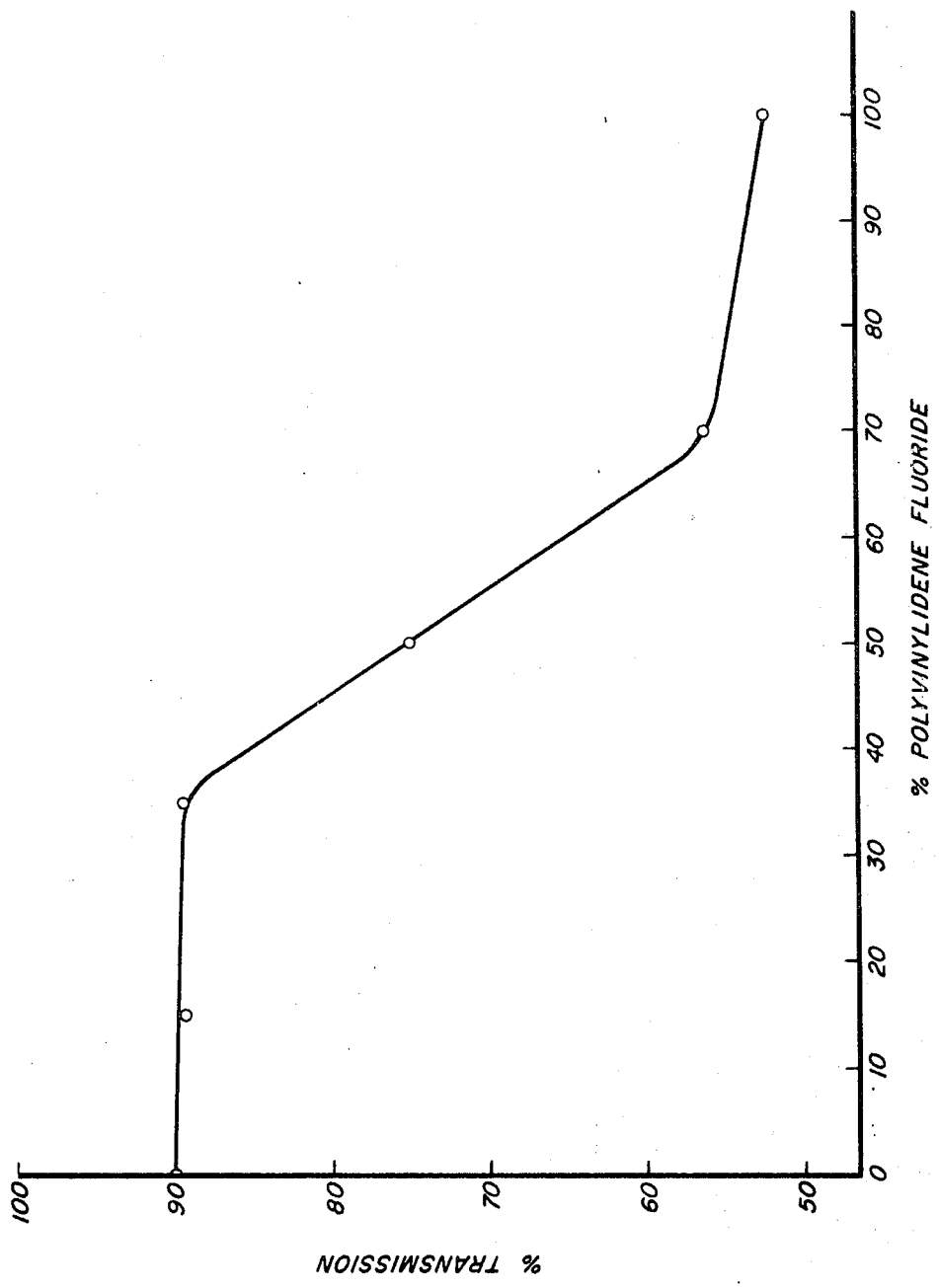

3,459,834
TRANSPARENT MOLDING COMPOSITIONS COMPRISING METHACRYLATE POLYMERS BLENDED WITH A MINOR AMOUNT OF POLY(VINYLIDENE FLUORIDE)
Joseph Michael Schmitt, Ridgefield, Conn., assignor to American Cyanamid Company, Stamford, Conn., a corporation of Maine
Continuation-in-part of application Ser. No. 432,839, Feb. 15, 1965. This application Sept. 21, 1966, Ser. No. 581,044
Int. Cl. C08f 37/18
U.S. Cl. 260—898
10 Claims

ABSTRACT OF THE DISCLOSURE

Compositions of matter having physical properties superior to those of the compositions of the prior art and composed of a blend of from about 65% to about 95% of a methyl methacrylate or ethyl methacrylate polymer and from about 5% to about 35% of poly(vinylidene fluoride) are disclosed.

---

This application is a continuation-in-part of my earlier copending application Ser. No. 432,839, filed Feb. 15, 1965, and now abandoned.

Patents directed to compositions produced by physically blending various polymers with one another have been prevalent in the prior art. For example, U.S. Patent No. 3,253,060 discloses physical blends of methyl methacrylate polymers with poly(vinylidene fluoride). The blends contain up to 50% of the poly(vinylidene fluoride), hereinafter sometimes called PVDF. Poly(methyl methacrylate) per se is noted for its water-white color and its excellent transparency, i.e. light transmission. PVDF, on the other hand, is noted for its elasticity and toughness.

Normally one would expect that blends of these two polymers would have properties that run linearly, that is, a 50/50 blend would have half the properties of each polymer. Generally, I have found that this is the case, however, I have now found that polymers of methyl methacrylate or ethyl methacrylate can be physically blended with from about 5% to about 35% of PVDF to give compositions which possess unexpected properties. That is to say, I have found that methyl methacrylate polymers, such as poly(methyl methacrylate), or ethyl methacrylate polymers, such as poly(ethyl methacrylate) can be blended with PVDF to produce compositions which not only possess the toughness and elasticity of PVDF but also are unexpectedly transparent, i.e. have excellent light transmission. This combination of properties advantageously permits usage of said compositions in applications where analogous compositions are ineffective.

It is, therefore, an object of the present invention to provide novel compositions of matter.

It is a further object of the present invention to provide novel compositions of matter composed of a blend of a polymer of methyl or ethyl methacrylate and PVDF.

It is a further object of the present invention to provide novel compositions of matter composed of a physical blend of from about 65% to about 95%, by weight, of a polymer of methyl or ethyl methacrylate and from about 5% to about 35%, by weight, based on the total weight of the composition, of poly(vinylidene fluoride).

As mentioned above, the first component of my novel composition is a polymer of methyl or ethyl methacrylate. This component can consist of a pure homopolymer of methyl or ethyl methacrylate or a copolymer of either monomer with minor amounts, i.e. up to about 30%, by weight, of at least one comonomer copolymerizable therewith. Examples of the comonomers which may be utilized with the methyl or ethyl methacrylate, and which can be copolymerized therewith by any known procedure either singly or in a plurality, include such monomers as the unsaturated alcohol esters, more particularly the allyl, methallyl, crotyl, vinyl, methvinyl, 1-phenylallyl, butenyl, etc., esters of saturated and unsaturated aliphatic and aromatic monobasic and polybasic acids such as acetic, propionic, butyric, valeric, crotonic, glutaric, adipic, maleic, fumaric, itaconic, benzoic, phthalic, terephthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl chloride, divinyl benzene, allyl benzene, diallyl benzene, the various alpha-substituted styrenes and alpha-substituted ring-substituted styrenes, e.g., alpha-methyl styrene, alpha-methyl-paramethyl styrene, etc.; unsaturated ethers, e.g., ethyl vinyl ether, diallyl ether, etc.; unsaturated amides, for instance, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; ethylene; unsaturated polyhydric alcohol (e.g., butenediol, etc.) esters of saturated and unsaturated, aliphatic and aromatic, monobasic and polybasic acids; acrylates such as ethyl acrylate, acrylonitrile and the like.

A preferred embodiment of my invention resides in the use of a polymer of methyl methacrylate or ethyl methacrylate and a comonomer copolymerizable therewith which contains free carboxyl groups, in amounts up to about 10%, by weight, preferably 3–8%, by weight. Examples of suitable carboxylic monomers include acrylic acid, methacrylic acid, itaconic acid, fumaric acid, mesaconic acid, ethylene dicarboxylic acid, maleic acid, citraconic acid, vinyl benzoic acid, vinyl sulfonic acid, styrene sulfonic acid and the like.

The second component of my novel compositions is poly(vinylidene fluoride). This component is preferably utilized as a pure homopolymer. It is tolerable, however, to employ a vinylidene fluoride polymer which contains minor amounts, i.e. up to about 5%, of a second monomer which may be present therein as an additive, an impurity, etc. or for any other purpose, as long as the chemical or physical properties of the PVDF per se are not materially altered, i.e. remain the same as the pure homopolymer. The PVDF may be prepared by any known process. One process which may be used is set forth in U.S. Patent No. 2,435,537, which patent is hereby incorporated herein by reference.

The PVDF may be blended with the methyl or ethyl methacrylate polymer in amounts ranging from about 5% to about 35%, as mentioned above. It is preferred, however, that from about 10% to about 30%, by weight, based on the total weight of the blend, be employed, in that the utilization of such concentrations results in the formation of compositions having optimum transmission and toughness.

Any known procedure may be utilized to blend the components of the instant compositions with one another with any known device being tolerable. For example, one may utilize a rubber mill, a devolatilizer-extruder, a Banbury mixer or the like. The polymeric components may be blended, utilizing the appropriate device, in solid form, in solution or as a suspension without detracting from the attractive properties of the final blend which are further specified hereinbelow. When the components are blended as liquids or in solution, the volatiles may be removed after blending by any known technique, such as evaporation. Nonvolatiles may be removed by extraction, precipitation and the like.

The compositions of the present invention, as mentioned above, have attractive tensile and extension properties. They are colorless materials and are transparent, i.e. permit maximum light transmission. The melt index of the compositions decreases while the extension properties increase in direct relationship with the increase in poly(vinylidene fluoride) in the composition. They are thermoplastic materials capable of being molded, e.g. by compression or injection molding procedures, extruded into sheet or film, hot-shaped, drawn, machined, welded, etc. into useful articles. Because of the higher extension values of the compositions, articles made therefrom are less liable to fail when subjected to bending or stretching forces.

My novel compositions may be compounded or mixed with extraneous additives such as pigments, dyes, binders such as glass, ultraviolet light absorbers, inhibitors, stabilizers, lubricants, other resins and the like without detracting from the novel properties mentioned hereinabove.

My novel compositions find use in such applications as surface coatings, appliance housings, display signs, windows, light diffusers, wire coatings, press-fit inserts, plastic parts requiring metal inserts, screws, etc. and the like.

The following examples are set forth for purpose of illustration only and are not to be construed as limitations on the instant invention except as set forth in the appended claims. All parts and percentages are by weight unless otherwise specified.

Example 1

To a 6 inch, 2-roll rubber mill are added 85 parts of poly(methyl methacrylate) and 15 parts of poly(vinylidene fluoride). The mill is maintained at a temperature of 180° C. and the ingredients are thoroughly blended for 5 minutes. The resultant composition is recovered and compression molded at 180° C. and a pressure of 800 p.s.i. into a specimen 2″ x 2″ x 3/16″. The resultant molded article is water-white and transmits 89.4% of light.

Following the procedure of Example 1 various other compositions are produced with varying amounts of each component. Additional runs are also made utilizing copolymers and terpolymers of methyl or ethyl methacrylate. Each composition is collected, molded and tested utilizing ASTM method D-638, Type II. The "Extension Beyond Yield" test is conducted by elongating a specimen via the above test at a cross head speed of 0.2 inch per minute. The value representing said property is determined by measuring the distance, in inches, that each specimen elongates from the yield point to the break point. The results obtained from the above enumerated runs are set forth in table hereinbelow.

TABLE

| Ex. | PMMA | PVDF | Tensile strength (p.s.i.) | Extension [2] (in.) Beyond yield | Total | Color | Percent light transmission |
|---|---|---|---|---|---|---|---|
| 1 | 85 | 15 | 9,000 | 0.60 | 0.70 | Water-white | 89.4 |
| 2(comp) | 100 | 0 | 10,000 | 0.00 | 0.16 | ___do___ | 90.0 |
| 3 | 95 | 5 | 9,700 | 0.23 | 0.33 | ___do___ | 89.8 |
| 4 | 80 | 20 | 8,800 | 0.75 | 0.84 | ___do___ | 89.6 |
| 5 | 70 | 30 | 7,900 | 2.00 | 2.08 | ___do___ | 89.5 |
| 6 | 65 | 35 | 7,400 | 2.25 | 2.35 | | 89.9 |
| 7(comp) | 50 | 50 | 6,100 | 2.76 | 2.83 | Cloudy | 74.7 |
| 8(comp) | 30 | 70 | 4,600 | 3.50 | 3.60 | Opaque | 56.2 |
| 9(comp) | 0 | 100 | | | 5.00 | ___do___ | 53.3 |
| 10 | [3] 95 | 5 | 9,600 | 0.24 | 0.34 | Water-white | 89.1 |
| 11 | [4] 95 | 5 | 9,800 | 0.21 | 0.31 | ___do___ | 89.0 |
| 12 | [5] 95 | 5 [1] | 9,500 | 0.22 | 0.34 | ___do___ | |

[1] This composition was of a clear, hard, grainy consistency and showed excellent adherence when used to bond two 6″ x 6″ aluminum plates together.
[2] Initial length of specimen before extension is 3.2 in. between fillets.
[3] MMA/ST/AN 71/19/10.
[4] MMA/EA 90/10.
[5] MMA/MMA 95/5.

Note.—comp=comparative; PMMA=poly(methyl methacrylate); PVGF=polyvinylidene fluoride; MMA=methyl methacrylate; ST=styrene; AN=acrylonitrile; EA=ethyl acrylate; MMA=methacrylic acid.

Similar results were obtained when ethyl methacrylate was substituted for the methyl methacrylate in the polymers shown above.

The figure shows a plot of the percent light transmission of various PMMA/PVDF blends as the concentration of the PVDF therein increases. The plot is taken from the above Table. It can readily be seen that the percent light transmission of the blends within the scope of the present invention remains relatively constant. However, when the system approaches a 50/50 blend, i.e. concentrations outside the present invention, the percent light transmission rapidly drops off to an intolerable level.

I claim:
1. A composition of matter comprising a blend of a polymer containing at least 70% of methyl or ethyl methacrylate and, substantially homogeneously dispersed therein, from about 5% to 35%, by weight, based on the total weight of the blend, of poly(vinylidene fluoride).

2. A composition according to claim 1 containing from 10% to about 30%, by weight, of poly(vinylidene fluoride).

3. A composition of matter comprising a blend of a polymer of methyl or ethyl methacrylate containing methyl or ethyl methacrylate and up to about 30% of at least one vinyl monomer copolymerizable therewith and, substantially homogenously dispersed therein, from about 5% to about 35%, by weight, based on the total weight of the blend, poly(vinylidene fluoride).

4. A composition according to claim 3 wherein said polymer is a terpolymer of methyl methacrylate, acrylonitrile and styrene.

5. The composition of claim 1 in the form of a molded article.

6. The composition of claim 2 in the form of a molded article.

7. The composition of claim 3 in the form of a molded article.

8. A composition according to claim 3 wherein said monomer contains free carboxyl groups.

9. A composition according to claim 1 comprising a blend of poly(methyl methacrylate) and poly(vinylidene fluoride).

10. A composition according to claim 1 comprising a blend of poly(ethyl methacrylate) and poly(vinylidene fluoride).

References Cited

UNITED STATES PATENTS

| | | | |
|---|---|---|---|
| 3,031,437 | 4/1962 | Iserson | 260—87.7 |
| 3,193,539 | 7/1965 | Hauptschein | 260—87.7 |
| 3,253,060 | 5/1966 | Koblitz et al. | 260—900 |
| 3,345,434 | 10/1967 | Griffith | 260—901 |

FOREIGN PATENTS 684,195   4/1964   Canada.

MURRAY TILLMAN, Primary Examiner

K. E. KUFFNER, Assistant Examiner

U.S. Cl. X.R.

260—900, 901